US 6,792,167 B2
United States Patent
Honda et al.

(10) Patent No.: US 6,792,167 B2
(45) Date of Patent: Sep. 14, 2004

(54) OPTICAL SWITCH

(75) Inventors: Mitsutoshi Honda, Hitachi (JP);
Takashi Naito, Mito (JP); Tatsuya Sugita, Takahagi (JP); Masahiko Ando, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 135 days.

(21) Appl. No.: 10/226,309

(22) Filed: Aug. 23, 2002

(65) Prior Publication Data

US 2003/0147584 A1 Aug. 7, 2003

(30) Foreign Application Priority Data

Feb. 1, 2002 (JP) ......................................... 2002-025807

(51) Int. Cl.⁷ ........................... G02F 1/295; G02B 6/26; G02B 6/42; G02B 6/00
(52) U.S. Cl. ............................. 385/5; 385/16; 385/122
(58) Field of Search ........................... 385/1–10, 15–18, 385/39, 40, 122, 129–132

(56) References Cited

U.S. PATENT DOCUMENTS

| | | | | |
|---|---|---|---|---|
| 4,557,551 A | * | 12/1985 | Dyott | 385/30 |
| 5,136,669 A | * | 8/1992 | Gerdt | 385/39 |
| 5,444,802 A | * | 8/1995 | Shibata et al. | 385/16 |
| 6,081,634 A | * | 6/2000 | Attard | 385/16 |
| 6,493,478 B1 | * | 12/2002 | DeRosa et al. | 385/16 |
| 6,571,028 B1 | * | 5/2003 | LoCascio et al. | 385/16 |
| 6,684,003 B2 | * | 1/2004 | Lipson et al. | 385/23 |
| 6,697,542 B2 | * | 2/2004 | Platzman et al. | 385/5 |

FOREIGN PATENT DOCUMENTS

| | | |
|---|---|---|
| JP | 5-216079 | 8/1993 |
| JP | 11-337988 | 12/1999 |
| WO | WO99/14764 | 3/1999 |
| WO | WO 04/27689 | 4/2001 |

OTHER PUBLICATIONS

U.S. patent application Ser. No. 10/080,386, unavailable, filed unavailable.
Nikkei Electronics, Jan. 29, 2001, (No. 788), p. 163, Translation–in–Part.

* cited by examiner

Primary Examiner—Edward J. Glick
Assistant Examiner—Thomas R Artman
(74) Attorney, Agent, or Firm—McDermott Will & Emery LLP

(57) ABSTRACT

An optical switch includes at least one light-receiving core for receiving an optical signal, a plurality of light-emitting cores which are used selectively for emitting the optical signal, and a plurality of waveguides connecting the light-receiving core and the plurality of light-emitting cores. A nonlinear optical element which, when pumped, changes its refractive index by 2% or above relative to the surroundings to control a traveling direction of the optical signal is disposed near at least one of the plurality of waveguides.

13 Claims, 10 Drawing Sheets

FIG. 1
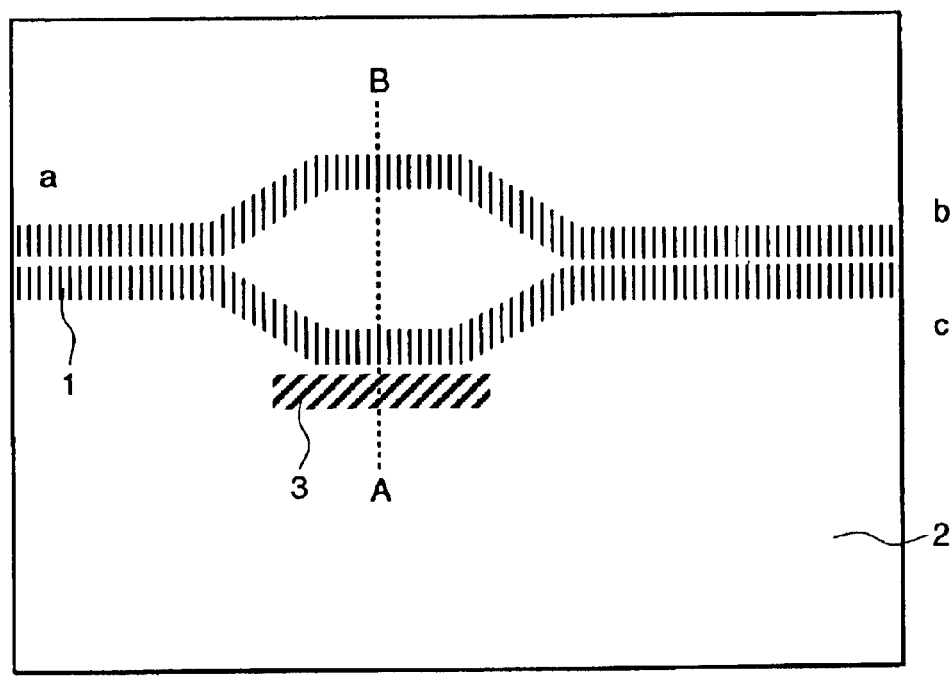
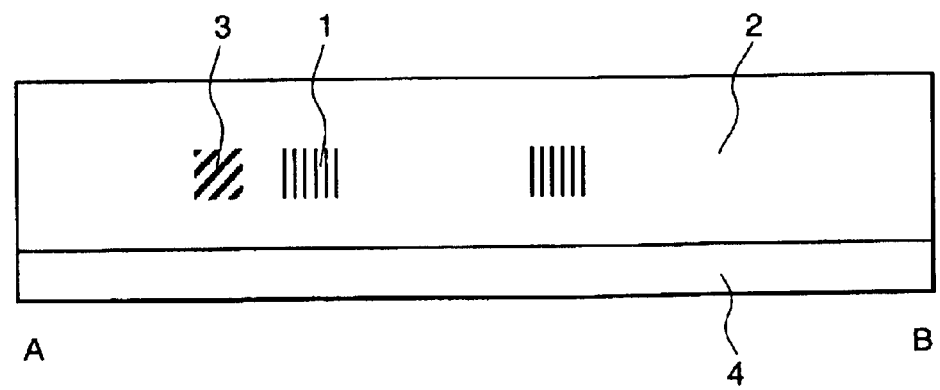

FIG. 4
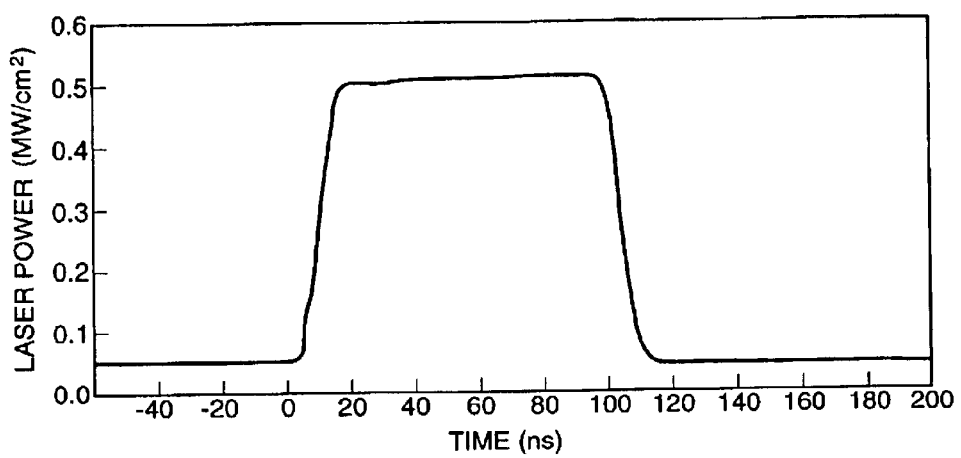
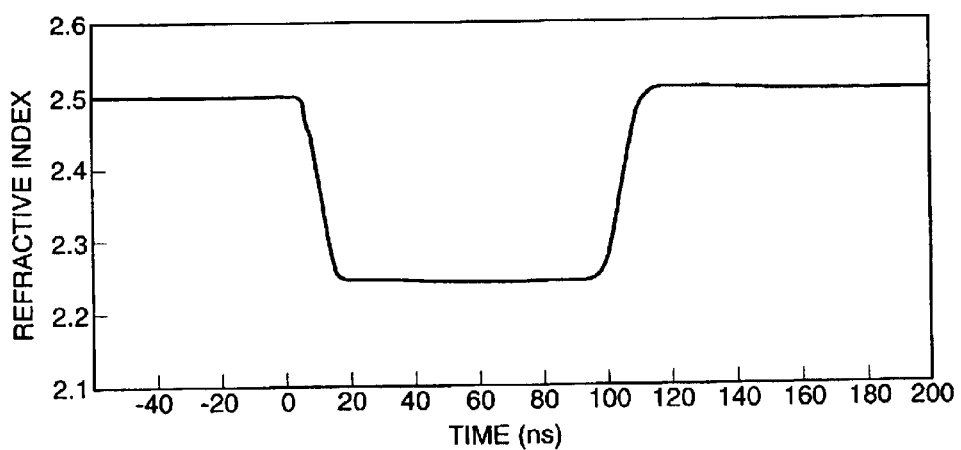
FIG. 6
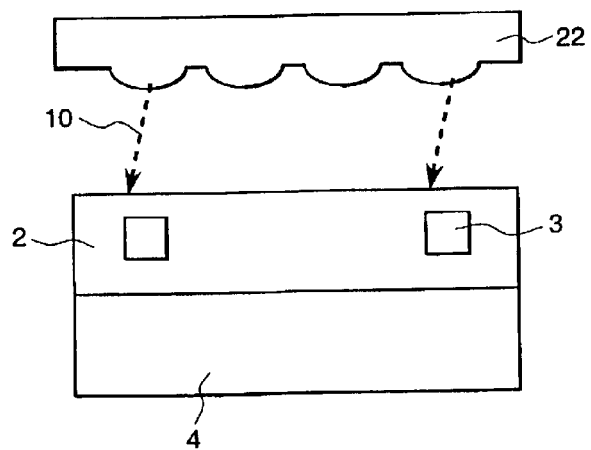

FIG. 7

| NONLINEAR OPTICAL MATERIAL | EXTINCTION COEFFICIENT | CHANGE OF REFRACTIVE INDEX | SWITCHING PERFORMANCE | RESPONSE SPEED |
|---|---|---|---|---|
| 95Co3O4+5SiO2TiO2 | 0.11 | 3.1% | ◎ | 1.2ps |
| Sr2CuO3 | 0.11 | 2.1% | ◎ | 12ns |
| Sr2CoO3 | 0.12 | 2.0% | ◎ | 11ns |
| Sr2NiO3 | 0.13 | 2.3% | ◎ | 11ns |
| Fe3O4 | 0.15 | 3.2% | ◎ | 1.2ps |
| Co3O4 | 0.15 | 3.0% | ◎ | 1.2ps |
| VO2 | 0.18 | 2.0% | ◎ | 11ns |
| Dy3Fe5O12 | 0.12 | 2.0% | ◎ | 12ns |
| ZnO | 0.13 | 2.0% | ◎ | 12ns |
| Fe3O4+10SiO2TiO2 | 0.2 | 3.2% | ◎ | 1.1ps |
| CoO | 0.2 | 1.8% | × | — |

FIG. 9

| NONLINEAR OPTICAL MATERIAL | REFLECTANCE | CHANGE OF REFRACTIVE INDEX | SWITCHING PERFORMANCE | RESPONSE SPEED |
|---|---|---|---|---|
| 66Co12Cr22Zr | 91% | 3.2% | ◎ | 12ns |
| 66Ni12Cr22Zr | 83% | 3.1% | ◎ | 10ns |
| 66Fe12Cr22Zr | 84% | 3.4% | ◎ | 11ns |
| 66Fe12Cr22Zr +SiO2 | 74% | 3.7% | ◎ | 12ns |

FIG. 8
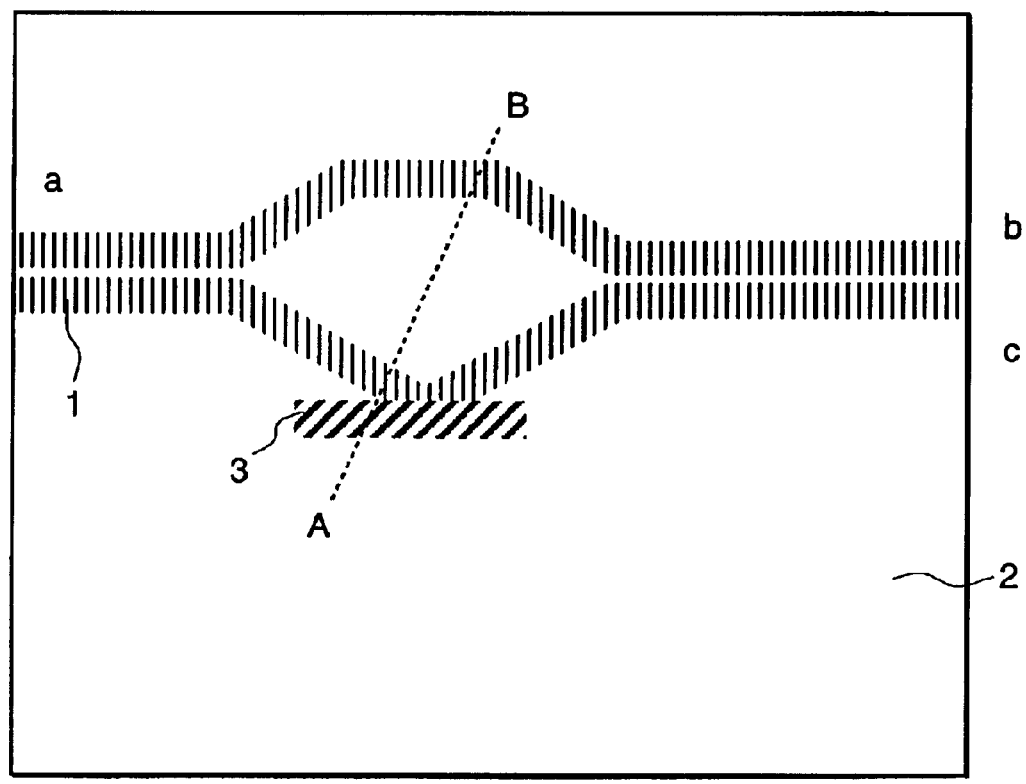
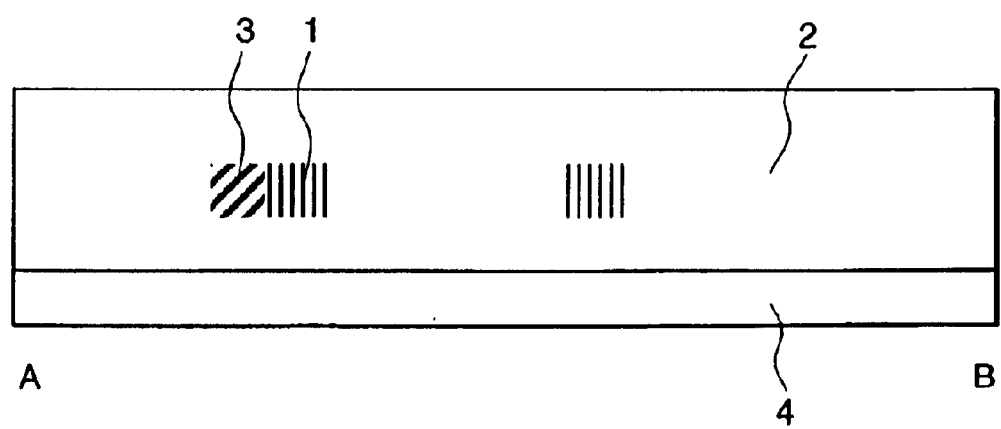

FIG. 10
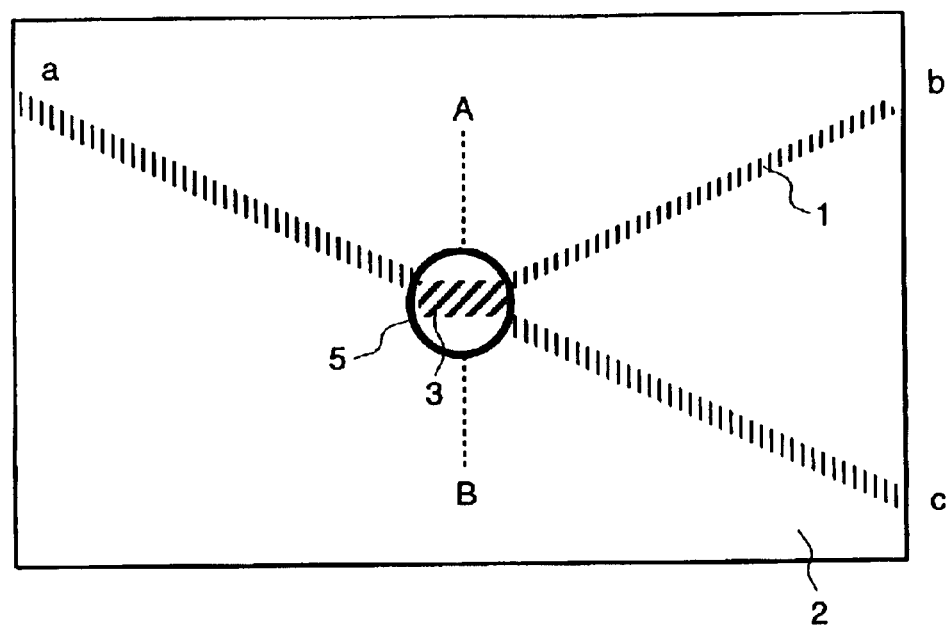
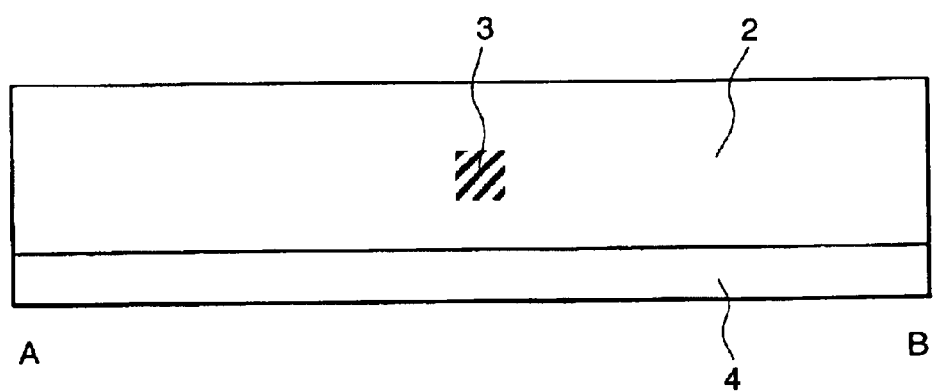

FIG. 11
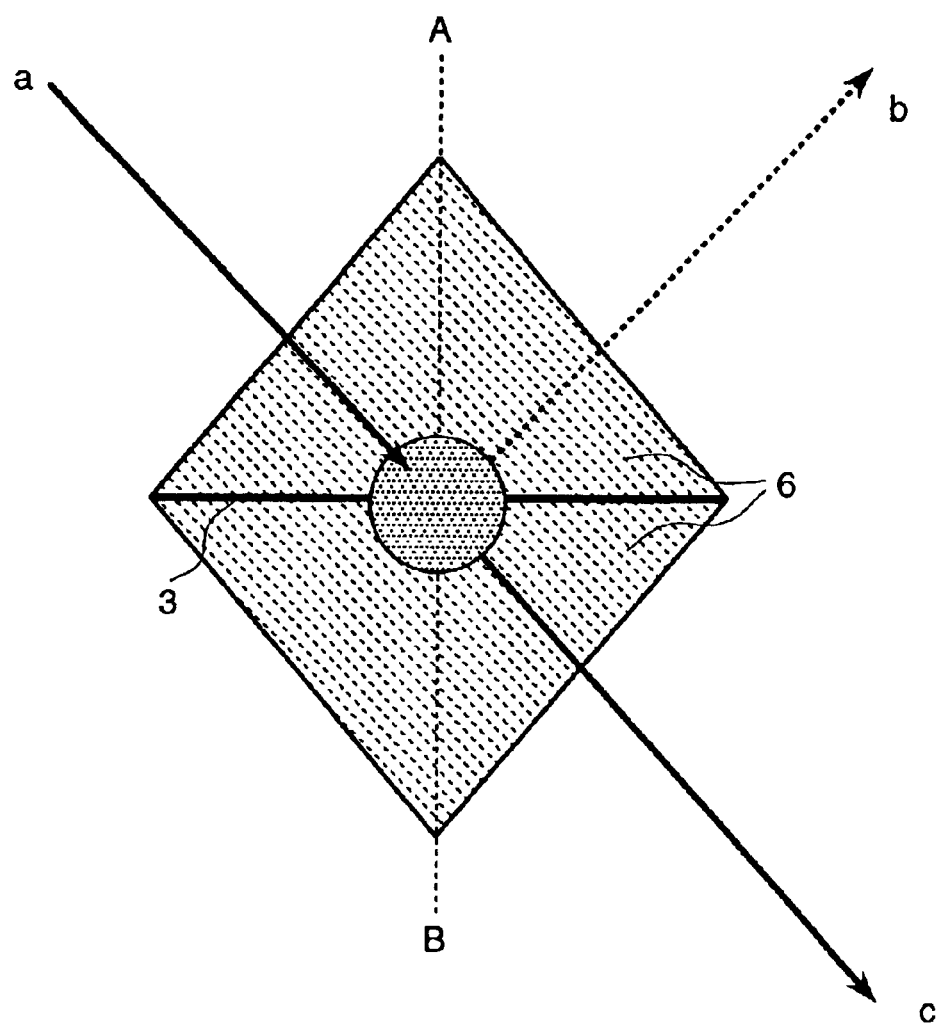
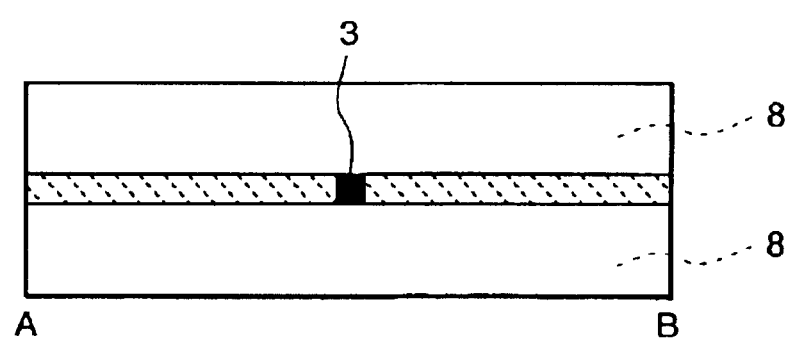

FIG. 13

| NONLINEAR OPTICAL MATERIAL | EXTINCTION COEFFICIENT | CHANGE OF REFRACTIVE INDEX | INTENSITY OF THE OUTPUT OPTICAL SIGNAL | SWITCHING PERFORMANCE | RESPONSE SPEED |
|---|---|---|---|---|---|
| 95Co3O4+ 5SiO2TiO2 | 0.11 | 3.1% | 70% | ◎ | 1.2ps |
| Sr2CuO3 | 0.11 | 2.1% | 75% | ◎ | 12ns |
| Sr2CoO3 | 0.12 | 2.0% | 69% | ◎ | 11ns |
| Sr2NiO3 | 0.13 | 2.3% | 73% | ◎ | 11ns |
| Fe3O4 | 0.15 | 3.2% | 67% | ◎ | 1.2ps |
| Co3O4 | 0.15 | 3.0% | 91% | ◎ | 1.2ps |
| VO2 | 0.18 | 2.0% | 1% | ◎ | 11ns |
| Dy3Fe5O12 | 0.12 | 2.0% | 61% | ◎ | 12ns |
| ZnO | 0.13 | 2.0% | 70% | ◎ | 12ns |
| Fe3O4+ 10SiO2TiO2 | 0.2 | 3.2% | 70% | ◎ | 1.2ps |
| CoO | 0.2 | 1.8% | 70% | × | — |

OPTICAL SWITCH

BACKGROUND OF THE INVENTION

The present invention relates to an optical switch and, more particularly, to an optical switch capable of operating at low power consumption, excellent in response speed, and having construction suitable for miniaturization and multichannelling.

An optical communication system capable of rapidly transmitting large-capacity information must be constructed for the further development of an information-oriented society. A wavelength division multiplexing system (WDM system) has been developed and the enhancement of transmission speed of networks has made a rapid progress.

A switching means for switching optical information is essential to achieving further rapid optical communication. A conventional optical information switching method needs light-to-electricity conversion means for converting optical information into corresponding electrical information and electricity-to-light conversion means for converting electrical information into corresponding electrical information at relay points. Total power consumption by the light-to-electricity conversion means and electricity-to-light conversion means increases and switching speed decreases with the increase of the number of relay points. Therefore, it is preferable that a rapid optical communication system employs optical switches capable of directly switching optical information.

Known optical switches including a mechanical optical switch, a plane optical waveguide optical switch, a mirror optical switch, and a bubble optical switch are mentioned in, for example, Nikkei Electronics, No. 8 (Jan. 29, 2000). Those conventional optical switches, however, need a switching time on the order of milliseconds and have difficulty in coping with future increases in capacity and communication speed of optical communication systems. The conventional optical switches require high electrical driving force for operation and consume much energy.

Japanese Patent Laid-open No. 11-337988 proposes an all-optical switch provided with nonlinear optical members and capable of quick response. This prior art optical switch has two nonlinear optical members and controls the two nonlinear optical members by two different optical control signals and hence this optical switch is large. Therefore, it is difficult to miniaturize a multichannel selector optical switch. Since the refractive index change ratio is small, power necessary for inducing a refractive index change on the order of 2% is in the high range of 5 to 50 $MW/cm^2$ and the power consumption of the optical switch is large.

SUMMARY OF THE INVENTION

Accordingly, it is an object of the present invention to provide an optical switch capable of operating at low power consumption and of being miniaturized, and having construction suitable for application to multichannelling.

According to a first aspect of the present invention, an optical switch includes at least one light-receiving core; a plurality of light-emitting cores which are used selectively for emitting the optical signal; and a plurality of waveguides connecting the light-receiving core and the plurality of light-emitting cores, wherein a nonlinear optical element which, when pumped, changes its refractive index by 2% or above relative to the surroundings to control a traveling direction of the optical signal is disposed near at least one of the plurality of waveguides.

According to a second aspect of the present invention, an optical switch includes: at least one light-receiving core for receiving an optical signal; a plurality of light-emitting cores which are used selectively for emitting the optical signal; and a plurality of waveguides connecting the light-receiving core and the plurality of light-emitting cores, wherein a nonlinear optical element which, when pumped, changes its refractive index by 2% or above relative to the surroundings to control the reflection of the optical signal is disposed on a wall of at least one of the plurality of waveguides.

According to a third aspect of the present invention, an optical switch includes at least one light-receiving core; a plurality of light-emitting cores which are used selectively for emitting an optical signal; and a plurality of waveguides connecting the light-receiving core and the plurality of light-emitting cores, wherein a nonlinear optical element which, when pumped, changes its refractive index by 2% or above relative to the surroundings to control the transmission/reflection of the optical signal is inserted in a hole formed in the waveguide.

According to a fourth aspect of the present invention, an optical switch includes at least one light-receiving core; a plurality of light-emitting cores which are used selectively for emitting an optical signal; and a plurality of waveguides connecting the light-receiving core and the plurality of light-emitting cores, wherein a nonlinear optical element which, when pumped, changes its refractive index by 2% or above relative to the surroundings to control the direction of the emitted optical signal is held between highly refractive substrates, an optical signal fallen on one of the highly refractive substrate is emitted through the other highly refractive substrate when the nonlinear optical element is not pumped, and an optical signal fallen on one of the highly refractive substrates is reflected by the same highly refractive substrate when the nonlinear optical element is pumped.

In any one of the foregoing optical switches, the nonlinear optical element and the substrate are stacked alternately to form an n×n matrix type optical switch.

The optical switch according to the present invention may further include a pumping light source that emits pumping light or a pumping power source that creates a pumping electric field for changing the refractive index of the nonlinear optical element.

The pumping light source or the pumping power source may have an output capacity of 1 $MW/cm^2$ or below.

Desirably, the refractive index of the nonlinear optical element has an extinction coefficient of 0.15% or below for a wavelength range of the optical signal.

The nonlinear optical element may have an energy gap corresponding to a wavelength in the range of 400 to 1200 nm.

The nonlinear optical element may be formed of a metal oxide selected from the group consisting of Co, Fe, Cr, Ni, V, Zn and Cu or a composite oxide containing the same metal oxide.

The nonlinear optical element may contain at least a metal selected from the group consisting of Co, Fe and Ni, and the metal is amorphous.

BRIEF DESCRIPTION OF THE DRAWINGS

The above and other objects, features and advantages of the present invention will become more apparent from the following description taken in connection with the accompanying drawings, in which:

FIG. 1 is a typical plan view and a typical sectional view taken on line A-B in the plan view of an optical switch in a first embodiment according to the present invention;

FIG. 3, comprising

FIG. 4 is a graph showing the variation of the refractive index of a nonlinear optical thin film for a measuring optical signal with time when the optical element is illuminated by pumping light;

FIG. 6 is a view of an optical switch employing a surface laser for emitting the pumping light;

FIG. 7 is a table showing the results of examination of the characteristics of nonlinear optical materials suitable for optical switches according to the present invention;

FIG. 8 is a typical plan view and a typical sectional view taken on line A-B in the plan view of an optical switch in a fourth embodiment according to the present invention;

FIG. 9 is a table showing the results of examination of the characteristics of nonlinear optical materials suitable for the optical switch in the fourth embodiment according to the present invention;

FIG. 10 is a typical plan view and a typical sectional view taken on line A-B in the plan view of an optical switch in a fifth embodiment according to the present invention;

FIG. 11 is a typical plan view and a typical sectional view taken on line A-B in the plan view of an optical switch in a sixth embodiment according to the present invention;

FIG. 13 is a table showing the results of examination of the characteristics of nonlinear optical materials suitable for the multichannel optical switch.

DESCRIPTION OF THE PREFERRED EMBODIMENTS

First Embodiment

Figure 2:
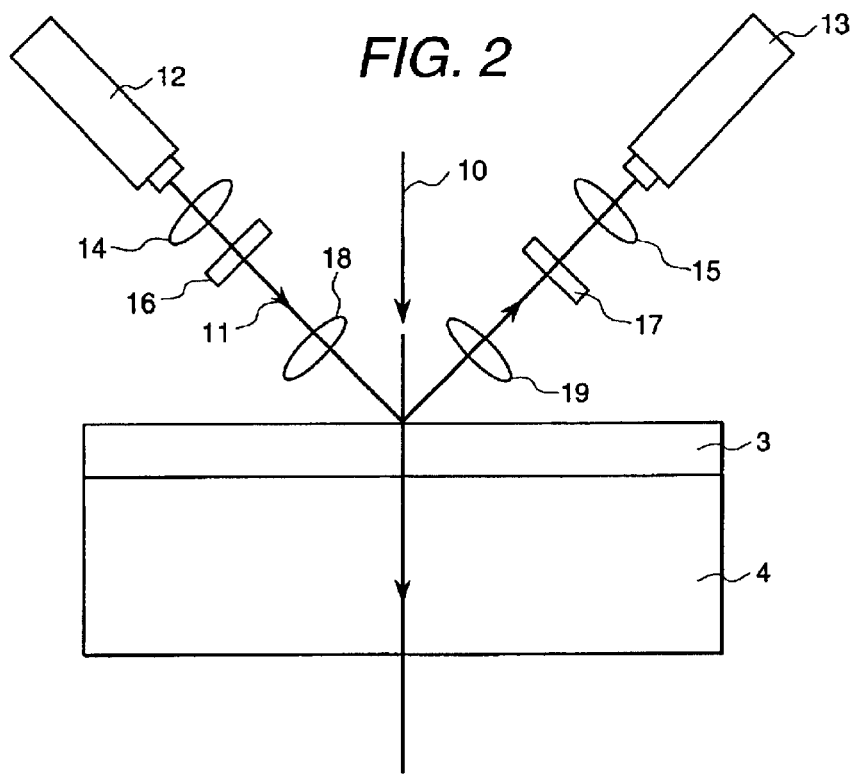
FIG. 2 is a schematic view of a measuring optical system for measuring the optical characteristics of an optical switch according to the present invention.

Referring to FIG. 1, an optical switch in a first embodiment according to the present invention includes a waveguide core 1, a cladding 2, a nonlinear optical thin film 3, and a substrate 4. The core 1 is formed of a composite oxide, such as $SiO_2$—$TiO_2$ prepared by mixing 1 mol % $TiO_2$ in $SiO_2$. The cladding 2 is formed of $SiO_2$. The nonlinear optical thin film 3 is formed of a composite oxide containing 95% by weight cobalt oxide, 3% by weight silicon oxide, and 2% by weight titanium oxide. Hereinafter, this composite oxide will be referred to as $95Co_3O_4$. The distance along line A-B between the nonlinear optical thin film 3 and the core 1 is 3 μm. The substrate is a 3 mm square, 1 mm thick $SiO_2$ glass substrate.

Referring to FIG. 2, a measuring optical system includes a pumping light source that emits pumping light 10 for changing the refractive index of the nonlinear optical thin film 3, a measuring light source 12 that emits a measuring optical signal 11, a collimator lens 14 for collimating scattering light rays emitted by the light source 12, a polarizer 16, a condenser lens 18, a condenser lens 19, an analyzer 17, a collimator lens 15 for collimating scattering light rays, and a light-receiving device 13 for receiving the measuring optical signal.

Figure 3A:
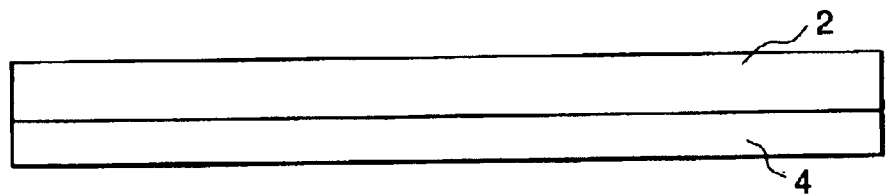
FIGS. 3(A), 3(B), 3(C) and 3(D), is a typical view of assistance in explaining an optical switch fabricating method of fabricating the optical switch shown in FIG. 1.
Figure 3B:
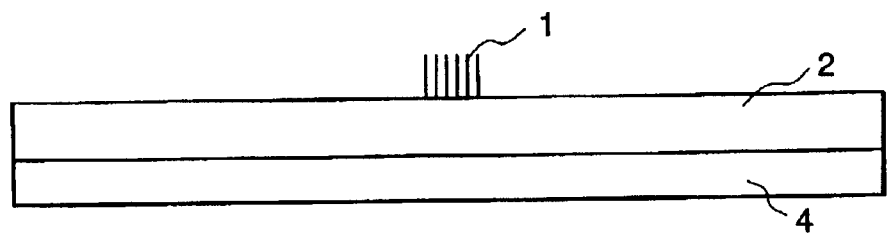
Figure 3C:
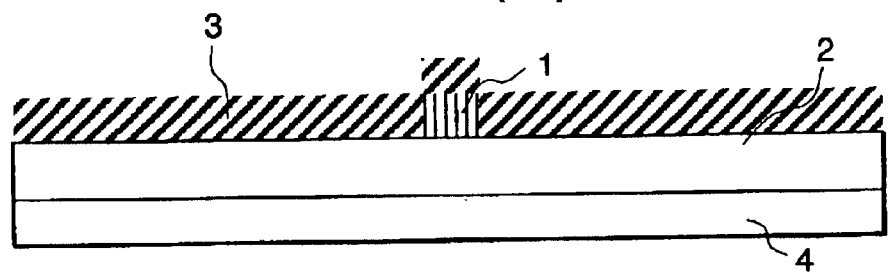
Figure 3D:
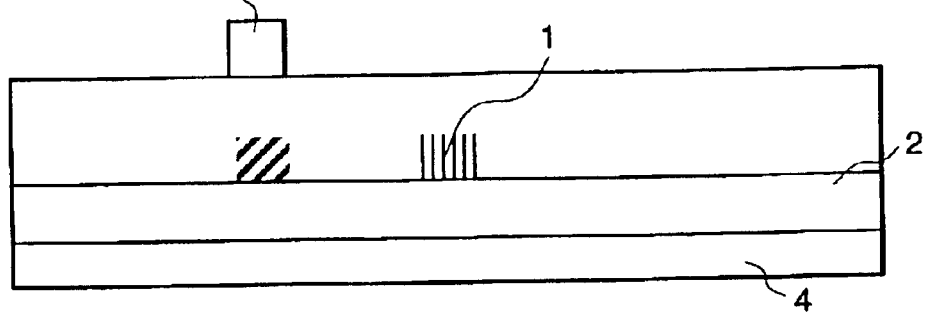

FIG. 3, comprising FIGS. 3(A) to 3(D), is a schematic view of a workpiece in different phases of an optical switch fabricating process. Referring to FIG. 3(A), a $SiO_2$ is deposited in a 15 μm thick film by a flame hydrolysis deposition process to form the cladding 2 on the 1 mm thick substrate 4. Referring to FIG. 3(B), a 6 μm thick composite oxide film of $SiO_2$—$TiO_2$ is deposited by a flame hydrolysis deposition process over the 15 μm thick cladding 2 formed on the 1 mm thick substrate 4, and the composite oxide film is processed by a high-temperature treatment at 1000° C. for densification. Then, a mask covering a part, corresponding to the core 1 shown in FIG. 1, of the composite oxide film is formed over the composite oxide film by lithography, and parts of the composite oxide film not covered with the mask are removed by etching, and then the mask is removed to form the waveguide core 1 shown in FIG. 1. Referring to FIG. 3(C), a 0.06 nm thick $95Co_3O_4$ film for forming the nonlinear thin film 3 is deposited on the surface of the core 1 by a sputtering process. Referring to FIG. 3(D), a mask covering a part, corresponding to the nonlinear thin film 3 shown in FIG. 1, of the $95Co_3O_4$ film is formed, and parts, not covered with the mask, of the $95Co_3O_4$ film are removed by an ion milling process to form the nonlinear optical thin film 3. Conditions for the ion milling process are acceleration voltage: 600 V, acceleration current: 320 mA, and processing time: 60 min. Then, a cladding layer is formed over the nonlinear optical thin film 3 by a flame hydrolysis deposition process.

Although a Cr electrode 8 is shown in FIG. 3(D), the Cr electrode 8 will be describe in connection with a second embodiment that uses the Cr electrode 8 because the Cr electrode 8 is irrelevant to the first embodiment.

The optical characteristics of the nonlinear optical thin film 3 were examined. A test piece was prepared by forming only a test nonlinear optical thin film 3 on a substrate 4. S-polarized light beam and p-polarized light beam were used as the measuring optical signal 11. An optical system that measures refractive index by ellipsometry was used. The optical system determines the refractive index of the test nonlinear optical thin film 3 on the basis of the difference between the reflectivity of the nonlinear optical thin film 3 to the s-polarized light beam and that of the same to the p-polarized light beam. The respective wavelengths of the pumping light 10 and the measuring optical signal 11 are optionally changeable.

A semiconductor laser having a maximum output capacity of 20 mW and capable of emitting a laser light beam of 650 nm in wavelength was used as a light source for emitting the pumping light 10. A laser normally used for communication and capable of emitting a light beam of 1550 nm in wavelength, and a semiconductor laser capable of emitting a light beam of 650 nm in wavelength, which is equal to the wavelength of the measuring optical signal 10, were used as light sources for emitting the measuring optical signal 11. The intensity of the measuring optical signal 11, as compared with that of the pumping light 10, was limited to a low level so that the test piece might not be pumped by the measuring optical signal 11.

FIG. 4 shows the variation of the refractive index of the test nonlinear optical thin film 3 with time when the test nonlinear optical thin film 3 was irradiated with the pumping light 10. The power of a pumping laser light pulse increased to a predetermined power level in about 12 ns after time when the pumping laser had been started. The refractive index of the test nonlinear optical thin film 3 decreased as the power of the pumping laser light pulse increased. The variation of the refractive index leveled off about 12 ns after the power of the pumping laser beam pulse had reached the predetermined level.

Figure 5:
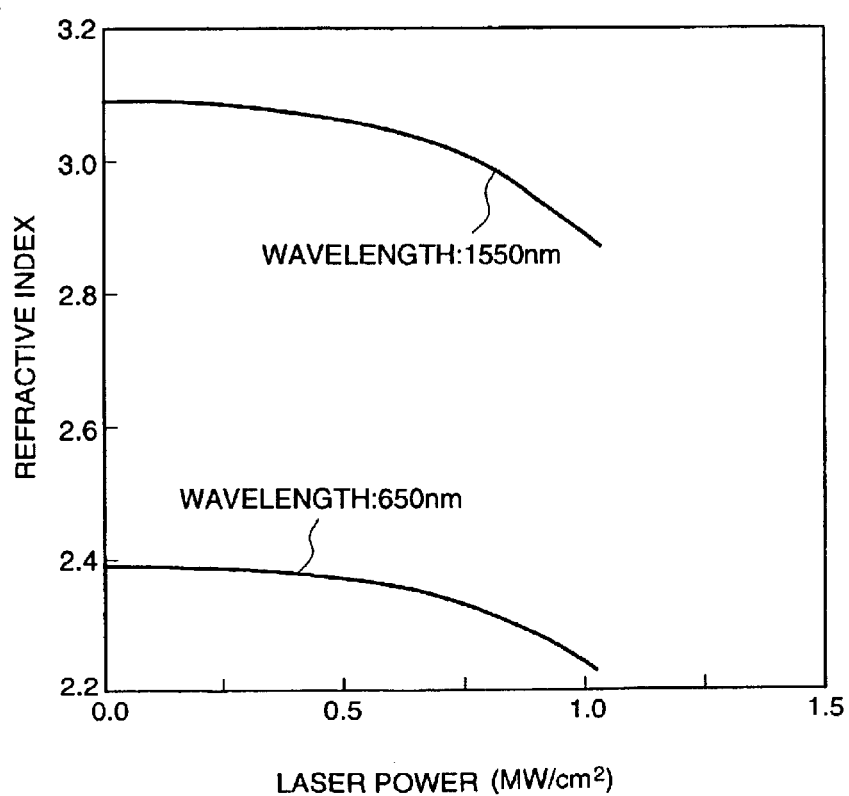
FIG. 5 is graph showing the variation of the refractive index of the nonlinear optical thin film when illuminated by the pumping light.

FIG. 5 shows the dependence of the refractive index of the nonlinear optical thin film 3 on the power of the pumping light 10 by way of example. As obvious from FIG. 5, the maximum refractive index decreased gradually as the power of the pumping light 10, i.e., the laser light pulse, increased gradually. Refractive index was measured 12 ns after the power of the pumping light 10 had reached the predetermined level to determine the dependence of the refractive index on the power of the pumping light 10. The refractive index of the nonlinear optical thin film 3 was 3.2 for the measuring optical signal of 1550 nm in wavelength and 2.4 for the measuring optical signal of 650 nm in wavelength when the nonlinear optical thin film 3 was not irradiated with the pumping light 10. The refractive index of the nonlinear optical thin film 3 for either of the two measuring optical signals decreased as the power of the pumping light 10 increased. When the power of the pumping light 10 was 0.5 $MW/cm^2$, the refractive index of the nonlinear optical thin film was about 3.1 for the measuring optical signal of 1550 nm in wavelength, and about 2.2 for the measuring optical signal of 650 nm in wavelength. When the power of the pumping light 10 was increased further, the refractive index decreased further. When the power of the pumping light 10 was 1 $MW/cm^2$, the refractive index was about 3.1 for the measuring optical signal 11 of 1550 nm in wavelength, and 2.2 for the measuring optical signal 11 of 650 nm in wavelength. The quality of the nonlinear optical thin film was deteriorated by the pumping light 10 when the power of the pumping light 10 increased beyond 1.5 $MW/cm^2$.

It is known from the results of the experimental results that the refractive index of the nonlinear optical thin film 3 changes when the nonlinear optical thin film 3 is irradiated with the pumping light 10 of 650 nm or above in wavelength. The nonlinear optical thin film 3 has a very high transmittance to light of 1550 nm in wavelength in a communication band and is capable of transmitting light with a low loss.

When the intensity of the pumping light 10, i.e., the laser beam, was 1 $MW/cm^2$ or below, the quality of the nonlinear optical thin film was not deteriorated and the refractive index could be greatly changed. When the power of the pumping light 10, i.e., the laser beam, was 0.5 $MW/cm^2$ or below, the power consumption of an optical switch system including the optical switch could be reduced and the refractive index of the nonlinear optical thin film could be changed greatly for switching.

FIG. 6 shows the optical switch combined with a surface laser 22 which emits pumping light 10. The branching point of each optical signal of the optical switch in the first embodiment was irradiated with the pumping light of 650 nm in wavelength emitted by the surface laser 22, and a change in the position of an output optical signal was measured.

When an optical signal was applied to the optical switch without irradiating the optical switch with the pumping light 10, the optical signal incident on a core a emerged from a core b. When an optical signal was applied to the optical switch while the optical switch was irradiated with the pumping light 10, the optical signal incident on the core a emerged from a core c. Thus, a change of the position of the output optical signal was observed. Response speed of the optical switch measured by using a photodiode and an oscilloscope was 12 ns, which reflected the characteristics measured by the foregoing experiments and proved that the optical switch is capable of high-speed switching.

The nonlinear optical thin film 3 of the optical switch in the first embodiment was pumped by the pumping light 10 emitted by the surface laser 22. The optical switch exercised a similar switching effect also when the nonlinear optical thin film 3 was pumped by a multiple light beam produced by superposing the pumping light 10 on the incident light beam incident on the core a and when the nonlinear optical thin film 3 was pumped by only the pumping light 10 propagated through the waveguide.

FIG. 7 is a table showing the results of examination of the characteristics of nonlinear optical materials suitable for forming the nonlinear optical thin films for optical switches according to the present invention. The nonlinear optical thin film of the optical switch in the first embodiment is formed of $95Co_3O_4$. The performance of nonlinear optical thin films respectively formed of $Sr_2CoO_3$, $Sr_2FeO_3$, $SrNiO_3$, $Fe_3O_4$, $Co_3O_4$, $VO_2$, $Dy_3Fe_5O_{12}$, ZnO and CoO was examined.

In FIG. 7, columns from the leftmost to the right are for nonlinear optical materials, extinction coefficients for a measuring optical signal of 1550 nm in wavelength, changes of refractive index for the measuring optical signal of 1550 nm in wavelength, intensities of an output optical signal from the optical switches corresponding to the first embodiment, switching performance and response speeds, respectively.

The intensity of the output optical signal is represented by the ratio in percent of the intensity of the output optical signal to that of incident light, and switching characteristic is expressed by a double circle indicating satisfactory switching or a cross indicating unsatisfactory switching. All the nonlinear optical thin films excluding the nonlinear optical thin film formed of CoO were satisfactory in switching characteristic.

It is known from the fact that the change of the refractive index of the nonlinear optical thin film of CoO was 0.05% and those of the rest of the nonlinear optical thin films were not smaller than 2% that characteristics can be detected when the change of refractive index is 2% or above. Optical switches respectively provided with a nonlinear optical thin film of $Co_3O_4$ and a nonlinear film of $Fe_3O_4$, whose refractive indices change greatly, were capable of responding in 1 ps for very quick switching.

It was found that quick switching of light can be achieved by disposing a nonlinear optical thin film, whose refractive index changes by 2% or above in a time on the order of nanoseconds, in the core 1 and the cladding 2. It was found that optical switches respectively provided with a $Co_3O_4$ thin film and a $Fe_3O_4$ thin film are capable of responding in a time on the order of picoseconds for switching.

Second Embodiment

An optical switch provided with a nonlinear optical thin film in a second embodiment according to the present invention is similar in construction as the optical switch in the first embodiment, except that the former is provided with a Cr electrode 8 as shown in FIG. 3(D) to apply a voltage across the nonlinear optical thin film.

When a voltage of 40 V was applied across the nonlinear optical thin film 3 by connecting a Si substrate and the Cr electrode 8 to a power source, the position of an output optical signal changed from a core b to a core c, as with the first embodiment in which the optical switch is irradiated with the pumping light 10. The optical switch could respond to voltage pulses in a high response speed on the order of nanoseconds. The optical switch in the second embodiment is a voltage-driven optical switch.

Third Embodiment

Experiments were conducted to make a fluorescent film of ZnS emit light by applying a voltage thereto and to change the refractive index of a nonlinear optical thin film 3 by the light emitted by the fluorescent film.

A 150 nm thick ZnS film, i.e., a light-emitting film, was formed on a cladding formed on a Si Substrate 4, and a 100 nm thick insulating film of $SiO_2$ was formed on the ZnS film. A 15 nm thick Cr film was formed on the insulating film, and a Cr electrode 8 was formed by subjecting the Cr film to photolithographic etching to complete an optical switch.

When a voltage of 4 V was applied across the Cr electrode 8 and the Si substrate 4, the ZnS thin film emitted fluorescent light. When the nonlinear optical thin film 3 was irradiated with the fluorescent light emitted by the ZnS thin film to change the refractive index of the nonlinear optical thin film 3, the optical switch responded at a high response speed for high-speed switching. The optical switch in the third embodiment using fluorescent light as pumping light is capable of operating at low power consumption, of responding at a high response speed and of being miniaturized.

Fourth Embodiment

Referring to FIG. 8 showing an optical switch in a fourth embodiment according to the present invention, the optical switch includes a waveguide core 1, a cladding 2, a nonlinear optical thin film 3, and a substrate 4. The core 1 is formed of a composite oxide, such as $SiO_2$—$TiO_2$ prepared by mixing 1 mol % $TiO_2$ in $SiO_2$. The cladding 2 is formed of $SiO_2$. The substrate is a 3 mm square, 1 mm thick $SiO_2$ glass substrate.

The nonlinear optical thin film 3 is formed of an amorphous metal containing 66 parts by mol Co, 12 parts by mol Cr, and 22 parts by mole Zr. Since the nonlinear optical thin film 3 is a metal thin film, an optical signal is reflected by the nonlinear optical thin film 3.

A method of fabricating the optical switch in the fourth embodiment is the same as that of fabricating the optical switch in the first embodiment shown in FIG. 3, except that the nonlinear optical thin film 3, i.e., the metal thin film, is in contact with the core 1.

The dependence of the position of an output optical signal on pumping light 10 was examined. A light beam of 650 nm in wavelength emitted by a surface laser was used as pumping light 10. When an optical signal was applied to the optical switch without irradiating the optical switch with the pumping light 10, the optical signal incident on a core a emerged from a core b. When an optical signal was applied to the optical switch while the optical switch was irradiated with the pumping light 10, the optical signal incident on the core a emerged from a core c. Response speed of the optical switch measured by using a photodiode and an oscilloscope was 1 ns, which proved that the optical switch is capable of high-speed switching.

When a voltage of 40 V was applied across the opposite ends d and e of the nonlinear optical thin film 3, the emerging position of the output optical signal changed from the core b to the core c, which was similar to the change of the position of the output optical signal when the optical switch was irradiated with the pumping light 10.

Although the nonlinear optical thin film 3 of the fourth embodiment was formed by cutting a metal thin film by an ion milling process, an optical switch formed by forming a hole in the waveguide and inserting an amorphous metal thin film in the hole of the waveguide has the same effect as the optical switch in the fourth embodiment.

FIG. 9 is a table showing the results of examination of the characteristics of nonlinear optical materials suitable for the optical switch in the fourth embodiment. In FIG. 9, Columns from the leftmost to the right are for nonlinear optical materials, reflectances for a measuring optical signal of 1550 nm in wavelength, changes of refractive index for the measuring optical signal of 1550 nm in wavelength, intensities of the output optical signal from the optical switches corresponding to the fourth embodiment, switching performance, and response speeds, respectively. The nonlinear optical thin film 3 of the optical switch in the fourth embodiment was formed of 66Co12Cr22Zr. Optical switches respectively having nonlinear optical thin films respectively formed of 66Ni12Cr22Zr, 66Fe12Cr22Zr, and a mixture of 66Co12Cr22Zr and 5% by mole of $SiO_2$ were tested. All the optical switches exhibited high-speed switching operation.

The optical switch in the fourth embodiment is provided with the reflecting amorphous metal film as the nonlinear optical thin film 3.

Fifth Embodiment

Referring to FIG. 10, an optical switch in a fifth embodiment according to the present invention is provided with a nonlinear optical thin film 3 for converting a transmitted light beam into a reflected light beam. The optical switch in the fifth embodiment includes a waveguide core 1, a cladding 2, a nonlinear optical thin film 3, and a substrate 4 provided with a hole 5 of 1 mm in diameter for receiving the nonlinear optical thin film 3 therein. The nonlinear optical thin film 3 was formed of $95Co_3O_4$ in 60 nm in thickness on a glass plate of 1 mm in diameter and 1 mm in thickness, and the glass plate provided with the nonlinear optical thin film 3 was fitted in the hole 5 of the substrate 4.

The dependence of the position of an output optical signal on pumping light 10 was examined. A laser beam of 650 nm in wavelength emitted by a surface laser was used as the pumping light 10 for irradiating the nonlinear optical thin film 3. When an optical signal was applied to the optical switch without irradiating the optical switch with the pumping light 10, the optical signal incident on a core a emerged from a core b. When an optical signal was applied to the optical switch while the optical switch was irradiated with the pumping light 10, the optical signal incident on the core a emerged from a core c. Response speed of the optical switch measured by using a photodiode and an oscilloscope was 1 ns, which proved that the optical switch is capable of high-speed switching.

When a voltage of 40 V was applied across the opposite ends d and e of the nonlinear optical thin film 3, the emerging position of the output optical signal changed from the core b to the core c, which was similar to the change of the position of the output optical signal when the optical switch was irradiated with the pumping light 10.

Although the nonlinear optical thin film 3 of the fifth embodiment was formed by cutting a metal thin film by an ion milling process, an optical switch formed by forming a hole in the waveguide and inserting a nonlinear optical metal thin film 3 in the hole of the waveguide has the same effect as the optical switch in the fifth embodiment.

Thus, the optical switch in the fifth embodiment is capable of achieving "transmitted light"⇔"reflected light" conversion. A thin film of NiO or $Fe_3O_4$ may be used instead of the nonlinear optical thin film 3 of $95Co_3O_4$.

Sixth Embodiment

Referring to FIG. 11, an optical switch in a sixth embodiment according to the present invention uses the optical switch in the third embodiment to convert transmitted light into reflected light. The optical switch in the sixth embodiment includes highly refractive substrates 6, and a nonlinear optical thin film 3. The substrates 6 are Si substrates having a refractive index of 3.4. The Si substrates 6 are processed in 75° to convert transmitted light into reflected light. The Si substrates 6 are fixedly held between and bonded with an adhesive, such as Araldite (trade name), to glass plates 8.

The dependence of the position of an output optical signal emerging from the optical switch on pumping light 10 was examined. Since the Si substrates 6 do not transmit light of 1050 nm or below in wavelength, a light beam of 1100 nm in wavelength emitted by a surface laser was used as the pumping light 10. When an optical signal was applied to the optical switch without irradiating the optical switch with the pumping light 10, the optical signal incident on a core a emerged from a core b. When an optical signal was applied to the optical switch while the optical switch was irradiated with the pumping light 10, the optical signal incident on the core a emerged from a core c. Response speed of the optical switch measured by using a photodiode and an oscilloscope was 11 ns, which proved that the optical switch is capable of high-speed switching. When a voltage of 40 V was applied across the opposite ends d and e of the nonlinear optical thin film 3, the emerging position of the output optical signal changed from the core b to the core c, which was similar to the change of the position of the output optical signal when the optical switch was irradiated with the pumping light 10.

Although the highly refractive substrates 6 of the optical switch in the sixth embodiment are triangular Si substrates, the shape in plane of the highly refractive substrates 6 is not limited to a triangle and the substrates 6 may be formed in any suitable shape provided that incident light a, transmitted light c and reflected light b are able to fall, penetrate and leave the side surfaces of the highly refractive substrates 6 substantially perpendicularly. For example, the respective apexes A and B of the triangular highly refractive substrates 6 shown in FIG. 11 may be rounded, may be formed in the shape of a circular or elliptic arc.

Seventh Embodiment

Figure 12:
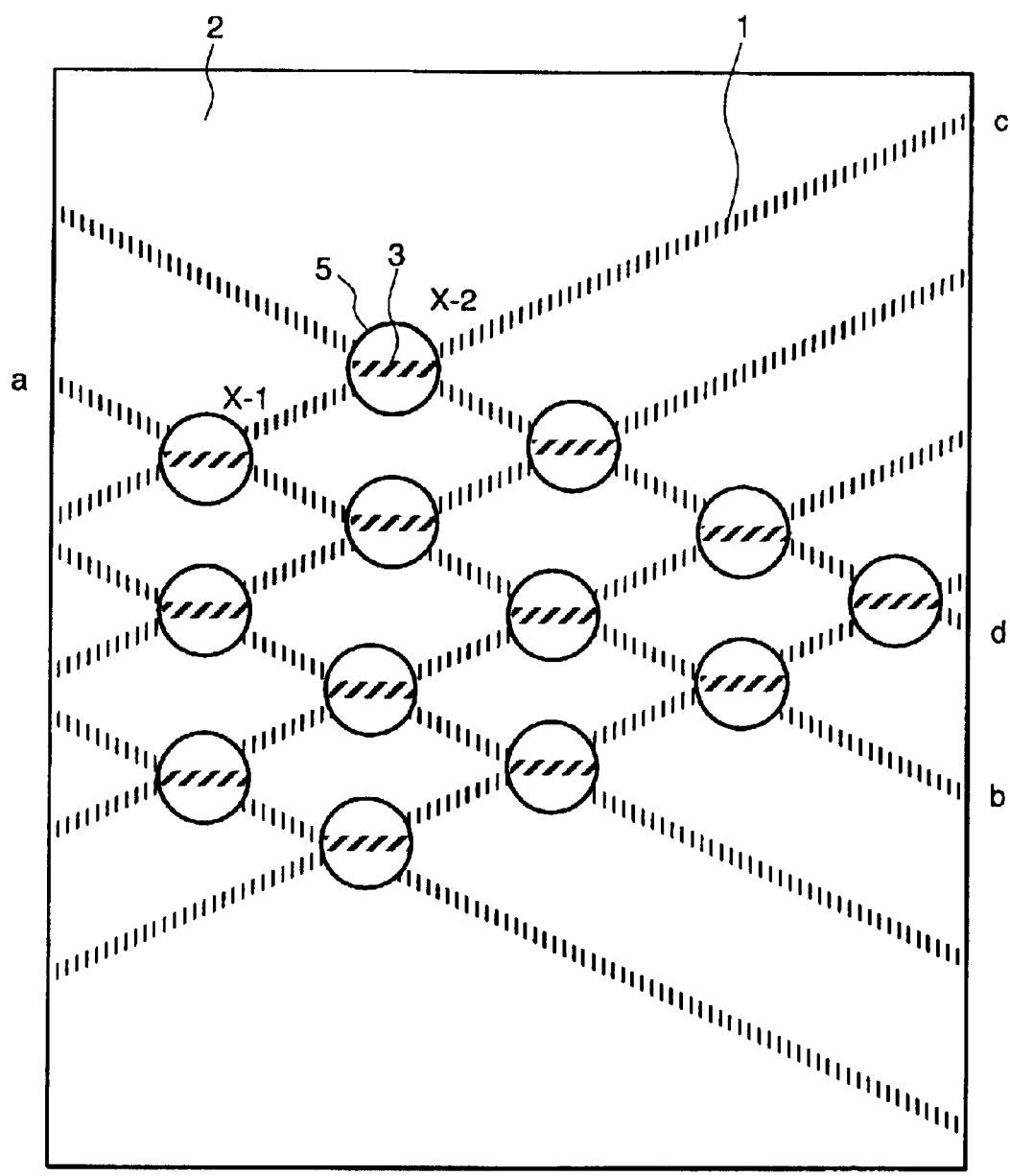
FIG. 12 is a plan view of a multichannel optical switch.

Referring to FIG. 12, a multichannel optical switch in a seventh embodiment according to the present invention is built by arranging optical switches similar to that in the fifth embodiment. As shown in FIG. 12, the multichannel optical switch in the seventh embodiment includes cores 1, a cladding 2, thirteen nonlinear optical thin films 3, and holes 5 for accommodating the nonlinear optical thin films 3. The multichannel optical switch in the seventh embodiment has four light-receiving optical paths and four light-emitting optical paths. A process of fabricating the multichannel optical switch in the seventh embodiment is similar to that of fabricating the optical switch in the fifth embodiment.

An optical signal falls on the left side, as viewed in FIG. 12, of the multichannel optical switch, and an output optical signal emerges from the right side, as viewed in FIG. 12, of the multichannel optical switch. A surface laser 22 is used for emitting pumping light beams 10. The nonlinear optical thin films 3 disposed at the intersections of the optical paths are irradiated with the pumping light beams 10 selectively; that is the pumping light 10 emitted by the surface laser 22 falls on the intersection point of each core. Timing of light emission by the surface laser 22 is determined on the basis of switching information included in an optical signal.

The positional relation between the pumping light 10 and the output optical signal was examined by using the optical switch in the seventh embodiment. When an optical signal was applied to the optical switch without irradiating the optical switch with the pumping light 10, the optical signal incident on a core a emerged from a core b. When an optical signal was applied to the optical switch while an X-1 of the optical switch was irradiated with the pumping light 10, the optical signal incident on the core a emerged from a core c. When an optical signal was applied to the optical switch while the X-1 and an X-2 of the optical switch were irradiated with the pumping light 10, the optical signal incident on the core a emerged from a core d.

FIG. 13 is a table showing the results of examination of the characteristics of nonlinear optical materials suitable for forming the nonlinear optical thin films of the multichannel optical switch. In FIG. 13, columns from the leftmost to the right are for nonlinear optical materials, extinction coefficients for a measuring optical signal of 1550 nm in wavelength, changes of refractive index for the measuring optical signal of 1550 nm in wavelength, intensities of the output optical signal from the optical switches corresponding to the first embodiment, switching performance and response speeds, respectively. The characteristics of most of those nonlinear optical materials were satisfactory. A nonlinear optical thin film 3 formed of $VO_2$ had a large extinction coefficient of 0.16. Large losses occurred in a multichannel optical switch provided with a nonlinear thin film 3 of $VO_2$ and the optical signal could be scarcely detected. It is known from the results of experiments that it is desirable that the extinction coefficient is 0.15 or below. Multichannel optical switches provided with nonlinear optical thin films of $Co_3O_4$ and $Fe_3O_4$ were capable of switching at a very high response speed of 1.2 ps.

Although the multichannel optical switch in the seventh embodiment is provided with optical switches similar to the optical switch in the fifth embodiment provided with the nonlinear optical thin film 3 accommodated in a hole formed in the substrate 4, multichannel optical switches provided with optical switches corresponding to the optical switches in the first to the fourth embodiment and the sixth embodiment demonstrated a high-speed optical signal switching capability.

The multichannel optical switch in the seventh embodiment can be operated for the high-speed switching of a plurality optical channels by irradiating the nonlinear optical thin films 3 disposed at the intersections of the optical paths with the pumping light 10.

As apparent from the foregoing description, the optical switch provided with the nonlinear optical thin film according to the present invention has an excellent response characteristic and is suitable for switching a large amount of information.

More concretely, the optical switch, having at least one input core a, a plurality of output cores b and c, and a plurality of waveguides connecting the plurality of output cores b and c, and provided with the nonlinear optical thin film 3 capable of changing its refractive index by 2% or above relative to the surroundings to control the traveling direction of the optical signal and disposed near at least one of the plurality of waveguides, is capable of operating for high-speed switching at a response speed in the range of 10 ns to 1 ps. Since the optical switch is very small, an n×n matrix optical switch can be realized.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An optical switch comprising:
   at least one light-receiving core for receiving an optical signal;
   a plurality of light-emitting cores which are used selectively for emitting the optical signal; and
   a plurality of waveguides connecting the light-receiving core and the plurality of light-emitting cores;

wherein a nonlinear optical element which, when pumped, changes its refractive index by 2% or above relative to the surroundings to control a traveling direction of the optical signal is disposed near at least one of the plurality of waveguides.

2. The optical switch according to claim 1, wherein the nonlinear optical element and the substrate are stacked alternately to form an n×n matrix type optical switch.

3. The optical switch according to claim 1 further comprising a pumping light source for changing the refractive index of the nonlinear optical element.

4. The optical switch according to claim 3, wherein the pumping light source has an output capacity of 1 MW/cm$^2$ or below.

5. The optical switch according to claim 1 further comprising a pumping power source for changing the refractive index of the nonlinear optical element.

6. The optical switch according to claim 5, wherein the pumping power source has an output capacity of 1 MW/cm$^2$ or below.

7. The optical switch according to claim 1, wherein the refractive index of the nonlinear optical element has an extinction coefficient of 0.15% or below for a wavelength range of the optical signal.

8. The optical switch according to claim 1, wherein the nonlinear optical element has an energy gap corresponding to a wavelength in the range of 400 to 1200 nm.

9. The optical switch according to claim 1, wherein the nonlinear optical element is formed of a metal oxide selected from the group consisting of Co, Fe, Cr, Ni, V, Zn and Cu or a composite oxide containing the same metal oxide.

10. The optical switch according to claim 1, wherein the nonlinear optical element contains at least a metal selected from the group consisting of Co, Fe and Ni, and the metal is amorphous.

11. An optical switch comprising:

at least one light-receiving core for receiving an optical signal;

a plurality of light-emitting cores which are used selectively for emitting the optical signal; and a plurality of waveguides connecting the light-receiving core and the plurality of light-emitting cores;

wherein a nonlinear optical element which, when pumped, changes its refractive index by 2% or above relative to the surroundings to control the reflection of the optical signal is disposed on a wall of at least one of the plurality of waveguides.

12. An optical switch comprising:

at least one light-receiving core for receiving an optical signal;

a plurality of light-emitting cores which are used selectively for emitting the optical signal; and a plurality of waveguides connecting the light-receiving core and the plurality of light-emitting cores;

wherein a nonlinear optical element which, when pumped, changes its refractive index by 2% or above relative to the surroundings to control the transmission/reflection of the optical signal is inserted in a hole formed in the waveguide.

13. An optical switch comprising:

at least one light-receiving core for receiving an optical signal;

a plurality of light-emitting cores which are used selectively for emitting the optical signal; and a plurality of waveguides connecting the light-receiving core and the plurality of light-emitting cores;

wherein a nonlinear optical element which, when pumped, changes its refractive index by 2% or above relative to the surroundings to control the direction of the emitted optical signal is held between highly refractive substrates, an optical signal fallen on one of the highly refractive substrates is emitted through the other highly refractive substrate when the nonlinear optical element is not pumped, and an optical signal fallen on one of the highly refractive substrates is reflected by the same highly refractive substrate when the nonlinear optical element is pumped.

* * * * *